April 23, 1968   C. H. T. WOODWARD   3,379,468
TRUCK COVER
Filed Jan. 11, 1967   2 Sheets-Sheet 1
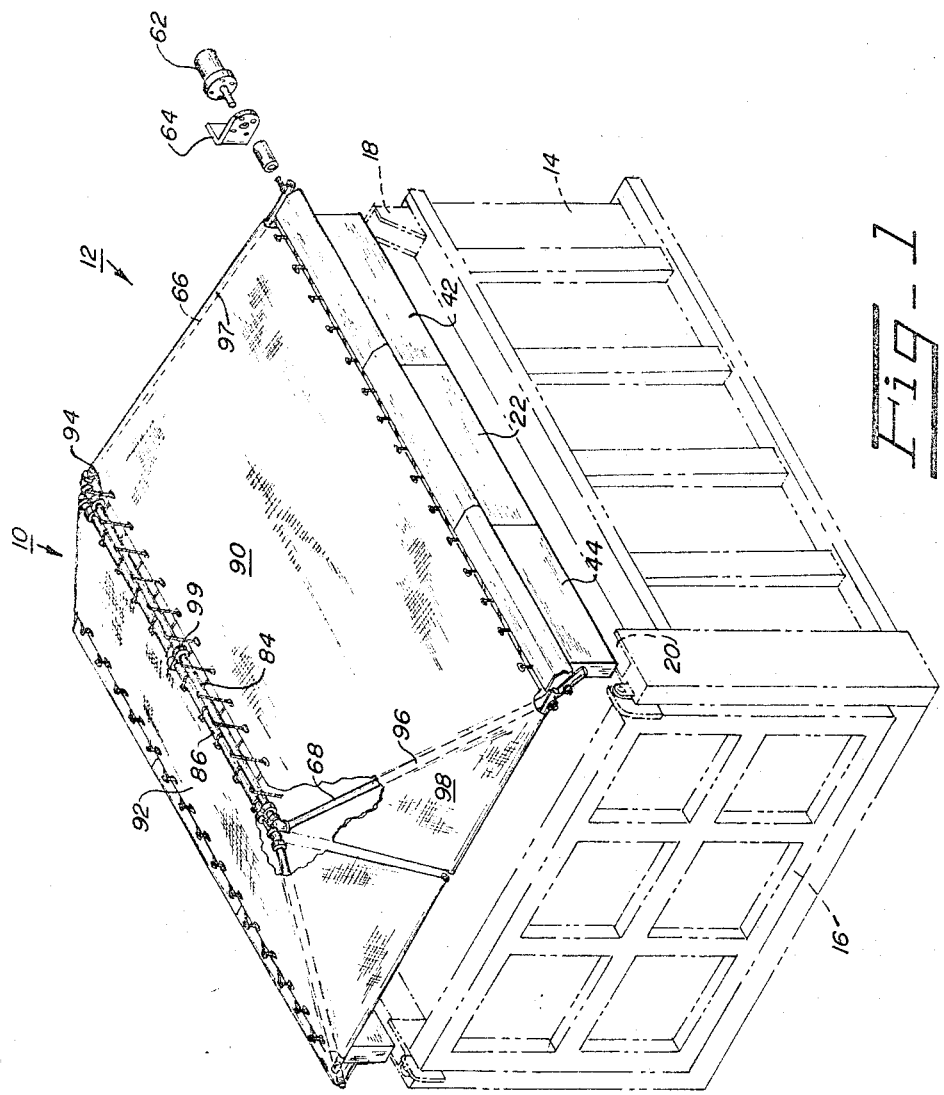
INVENTOR.
CYRIL H.T. WOODWARD
BY
Ralph R Roberts
AGENT.

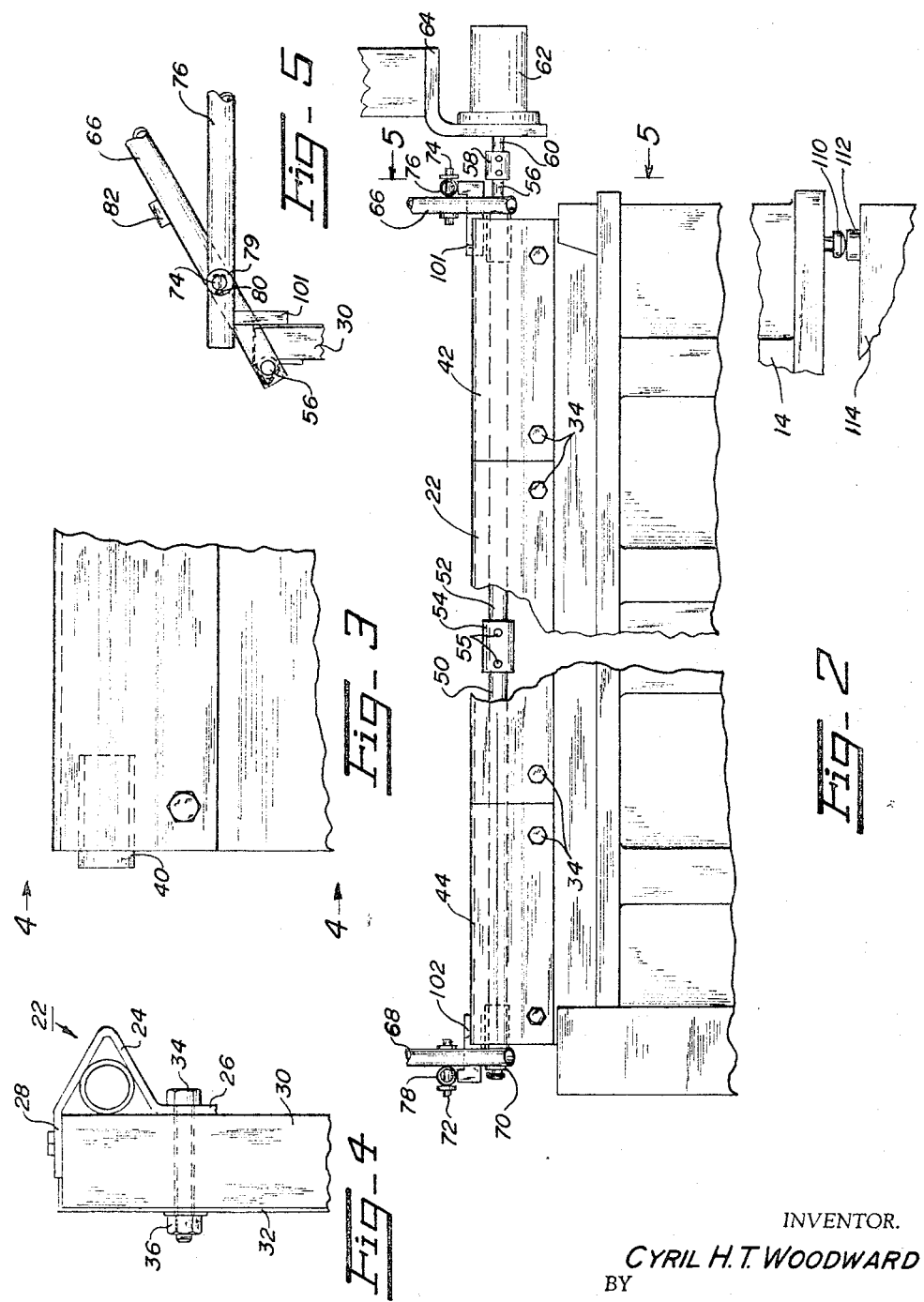

United States Patent Office 3,379,468
Patented Apr. 23, 1968

3,379,468
TRUCK COVER
Cyril H. T. Woodward, 160 Howard Ave.,
Rochelle Park, N.J. 07662
Filed Jan. 11, 1967, Ser. No. 608,697
10 Claims. (Cl. 296—100)

ABSTRACT OF THE DISCLOSURE

This invention pertains to a cover for dump truck bodies for hauling stone, gravel, and the like, and includes two main cover panels pivotally connected at the upper outer side of the truck body which panels at their upper or inner edge meet at an apex. Stop means is provided for limiting the inward rotational movement of the cover panels. Pivotally connected to the end members of the main cover frame are end flap members cammed into position to cover the ends of the loads as the main covers are swung to their inner covering position. The flap members are swung into alignment with the frame as the covers are swung to the side of the truck body. Rotation of the two main cover panels is by means of a hydraulic motor or the like.

BACKGROUND OF THE INVENTION

Field of the invention

The field of art to which this invention pertains is generally classified as land vehicles, bodies, and tops and more particularly to the general sub-classification of tops in which a particular sub-class applying to load covers is directed.

Description of the prior art

Many attempts and several patents have been issued for apparatus for providing covers for truck bodies, particularly those trucks in which sand, gravel, asphalt, crushed rock, and the like, is transported. The loads in the trucks because of the nature of loading as by shovel and dump bucket customarily results in the loads being peaked towards the center of the body and with the material comprising the loads being often of a dusty or dry nature. As the truck is driven down the highway, the air blowing over the load in the truck body has a tendency to blow the materials from the load and often into the way of passing or following motorists. Small rocks, gravel, and the like, not only cause damage to the cars and trucks coming in contact with this blowing debris, but the falling rocks may cause injury to by-standers and the like. The dirt and the like falling from the truck on hard-surface roads require cleaning or other removal. Because of these hazards nearly every state of the United States has laws requiring that such loads be covered. However, prior to this invention and so far as is known and in defiance of the law very few of these loads are covered primarily because of the time required and difficulty to place a canvas upon the load and fasten the cover in position, particularly if the covering of the load is to be done by one operator or truck driver.

The size of these dump truck bodies conventionally is approximately eight feet wide and from eleven to fourteen feet long and with the top of the body from eight feet from the ground, the covering of a load within such a body is usually more than a single operator can rapidly or easily cover. Therefore, in defiance of the law, covering such loads in dump truck bodies is not usually made. Several attempts to provide manipulated covers are evidenced in the many patents issued in this sub-class and particular attention is made to U.S. Patent No. 3,069,199 to Reardon of Dec. 18, 1962, and U.S. Patent No. 2,979,361 to Eppinger et al. issued Apr. 11, 1961. In these patents a cover is shown which provides a cover for the loads to be hauled within the body portion. However, it is to be noted that these conceptions are not adapted for ready mechanical manipulation. It is an intent and necessity for the truck cover of this invention to be mounted upon and to cover conventional dump truck bodies and to be rapidly and readily moved at the control of the operator. The covers of this invention are moved to the side of the truck during loading so that a power shovel operator may readily load the truck, and in the course of loading may come in contact with the top or the side of the truck body, hence it is necessary that the protective portions of the mechanism for moving these covers be readily replaceable or repairable.

SUMMARY OF THE INVENTION

The truck cover of this invention consists essentially of two panels comprising a metal outer frame with canvas or the like extending interiorly of this frame. The outer edge of the frame of the panel is pivotally carried within a protective steel framework so that a shaft portion of the frame extending from the front to the back of the panel may be rotated so as to cause the panel to be swung in an arc whose axis is the upper outer side of the truck body. Pivotally attached to the ends of the panel frame are link arms adapted to engage a predetermined stop so that when the panel is swung to its inner or closed position the link arm is cammed into a position parallel to the top plane of the truck body and is moving to the cammed position draws a triangular-shaped end flap into closed position to provide a deflector or wind screen. This deflector provides a means for preventing air being blown through the space above the covered truck body and across the load as the truck is moved down the highway, usually at rather rapid rates of speed.

It is therefore an object of this invention to provide a truck cover having two oppositely disposed side panels pivotally mounted on the upper outer portion of the truck body and adapted to be swung toward each other to provide a peaked cover having an apex higher than the sides of the truck body and having end flaps cammed into position to act as wind shields to prevent the unwanted blowing of air underneath the canvas panels.

BRIEF DESCRIPTION OF THE DRAWING

FIG. 1 represents an isometric view of the assembled and closed truck cover of this invention with the cover shown in place upon the phantom outlined truck body;

FIG. 2 represents a partly fragmentary side view in enlarged scale showing the framework and supporting members of one side panel of this invention;

FIG. 3 represents in enlarged scale a side view of a side plate and a torque shaft bearing in the side plate;

FIG. 4 represents an end view of the side plate and bearing of FIG. 3 taken on the line 4—4 and looking in the direction of the arrows; and FIG. 5 represents a fragmentary view showing the end member of the movable frame and the pivotal arrangement of the link arm attached thereto.

DESCRIPTION OF THE PREFERRED EMBODIMENT

Referring now in particular to the drawings in which like numbers refer to like members and in particular to FIG. 1 it is to be noted that the tent-like cover of this invention is generally composed of right and left panel covers generally designated 10 and 12. These are mirror images of each other and are adapted to meet substantially in the center of the truck body and at an apex of a determined height above the plane of the sides of the truck body. Shown in phantom outline and in a space relationship below the covers is an isometric view of a dump body 14 having an end gate 16 and having formed in its upper side walls a pair of beam retaining clips 18 and 20. The truck body shown and described is conventional and is usually about eight feet in width and ten to fourteen feet of interior length. As it is customary to provide spill or wear plates on the upper portions of the sides of these bodies 14. These spill plates are of oak or metal of about ten inches wide by two to three inches thick and are dropped into the retaining clips 18 and 20 and are replaced as they are damaged or worn out through attrition or engagement with rolling rock and the like. The spill plates also are often engaged orstrucv by the bucket of the loading mechanism as it is brought in the way of or over the truck body in the process of loading.

In the present invention it is intended that the spill plate normally carried in these clips will not be used and in place thereof a support portion of the truck cover is placed in these clips. Protection to the rotating mechanism is provided in the way of an outer trough cover member of V-shape construction and identified as 22. This member is generally seen in FIGS. 2 and 4 as having an outwardly extending V-portion 24 attached to a downwardly extending flange 26 and an upper attaching cover portion 28. This metal member 22 is attached to a wood plank 30 which is protected and reinforced on the inside thereof by an L-shaped metal plate 32 which is bolted in place on the wood member 30 by means of bolts 34 and nuts 36.

As seen in FIGS. 1 and 2 it is to be noted that the outer trough cover 22 is made in multiple portions, the end members, for example, having bearings in the form of pipes 40 welded in place in each of the V-portions 24, the bearings extending outwardly of or beyond the plate members themselves. As shown, a front plate 42 and a rear plate 44 is adapted to provide bearings in each end of the assembled outer trough cover. The middle protective cover 22 is of whatever length is required to fill in the distance between the front and the back portions 42 and 44. It is also to be noted that the intermediate portion 22 is removed during the coupling of torque pipe members 50 and 52 which are joined together as by coupling 54 and pins 55 so as to transmit the rotational forces from the front to the rear of the truck body. The front pipe 52 has an attached shaft 56 extending forwardly therefrom and by coupling 58 is rotationally coupled to the shaft 60 of a motor 62 held in place by a bracket 64.

Referring particularly to FIG. 5 it is to be noted that small cutouts are made in the beam 30 so that end frame members 66 and 68 may be rotated inwardly to lie at the desired angle forming an apex with the opposite cover. Both members 66 and 68 are pivotally carried by means of shaft extensions 56 and rear shaft 70, these shafts are preferably welded to the pipes 66 and 68. A short distance inwardly of the shaft extensions of each member 66 and 68 there is provided a pivot 72 and 74 extending forwardly and rearwardly on the members 66 and 68. Upon these pivots drop members in the form of pipes 76 and 78 are rotatable thereon and are held in place by means of washers 79 and cotter pins 79 and 80. Attached to members 66 and 68 are stops 82 for a purpose to be hereinafter described.

Referring once again to FIG. 1 it is to be noted that at or about the pivot points 74 and 76 the pipes 66 and 68 are bent towards each other at about ten degrees so that when the side panels are closed to form a tent the upper support members 84 and 86 are shorter than the lower side rotational drive members which is the pipe members 50 and 52 as assembled.

As seen in FIG. 1 the side frame comprising members 66 and 68 are attached to the upper member 84 as by elbows or may be welded into a single unitary structure. Members 66 and 68 are welded to the rotational shaft provided by pipe portions 50 and 52 so that as a rectangular frame when motor 62 is rotated the whole frame now as a unit is rotated to the closed position as shown. In the open position the frame lies adjacent the sides of truck body 14. To provide a wind screen or a cover there is shown a canvas 90 upon the rightward or nearer frame and a like canvas 92 on the other frame. These canvas covers are attached to the framework by means of an elastic lacing 94, which elastic lacing permits the canvas to be pushed outwardly as by rocks or a bulge in the peaking of the load so that the canvas is movable over the load and is not torn as the two covers are brought together. It is also to be noted that the cover is stitched at points 96 and 97 and the canvas is continued to form a small triangular portion 98 on each end, which portion when taut extends downwardly to the drop member to which it is attached to provide a wind screen and deflector. It is also to be noted that at the apex of the cover so as to prevent undue chafing of the lacing there are provided a plurality of resilient bumpers in the nature of rings 99 on members 84 and 86 which rings are adapted to cushion any impact and to prevent abrasion of one side cover against the other as the two inner wall members 84 and 86 are brought together.

The left side 10 is constructed in a manner and form identical to the right side 12 with the exception that it is a mirror image of side 12. Motor 62, looking in the direction of the truck body, rotates clockwise to close the cover 12 and counterclockwise to open the cover. Whereas a motor not shown but like motor 62 and of like configuration rotates counterclockwise to close cover 10 and clockwise to open the cover to bring the cover to the side of the truck body 14.

USE AND OPERATION

The cover of this invention is mounted to the truck body 14 in the following manner: The wooden beam 30 is dropped in the way of the clips or retainers 18 and 20 and through predrilled or otherwise aligned the members 44 and 42 are attached by bolts 34 to the wood member 30. Member 22 is absent the assembly until the cover framework is pivotally assembled in place. As reduced to practice, the upper member 84 is a piece of pipe threaded on both ends and adapted to enter elbows forming the ends of members 66 and 68, which members are welded to the shafts 50 and 52. These shafts are slid in through the bearings 40 and by means of coupling 54 and pins 55 are joined together so that one fixed frame comprising the coupled rotational drive members 50 and 52 and the ends 66 and 68 are joined by member 84 to form a generally rectangular frame movable as one unit by the rotation of shaft 56. The drop members 76 and 78 are pivotally mounted on the pins 72 and 74 and by means of washers 79 and cotter pins 80 are retained thereon.

Mounted on the truck body is a stop means for causing the forced lowering and retaining of members 76 and 78 in a parallel position to the top of the truck body when the cover is closed. This means is provided by mounting stops 101 and 102 to the front and the rear of the body. These stops are sized, spaced and positioned so as to engage the bars 76 and 78 as the ends 66 and 68 are rotated into cover closde positions. As the frame member 66 is rotated to the vertical and then leftwardly as looking in FIG. 5 the bar 76, of course, being pivoted has a tendency to swing into alignment with bar 66 and is prevented by stop 82 from preceding past the alignment of these bars. It is to be noted that the canvas ends 98 provide a limit of the swing of the drop member 76 so that when the members 66 are swung to their inner or cover closed position as seen at FIG. 1 the stops 101 and 102 engage the ends of members 76 to cause the end flaps 98 to be brought into tension and to provide taut wind screens.

The motor and bracket 62 and 64 are mounted to a bracket or are mounted directly on the truck body in a conventional manner to accommodate each of the various truck bodies. The motor shaft is coupled by means of coupling 58 to the pipe 52 and is ready to turn the framework. It is to be noted in the lower portion of FIG. 2 that an electrical contact is exemplified in the form of a button 110 and a receiving socket or button 112 the contact being made when the truck is in the lower position. This contact is provided so that the electrical current is fed to the motor 62 only when the truck is in the loading or down position. Motor 62, of course, may be a gear motor or in case of a hydraulic system may be a hydraulic motor driven in response to electrical circuitry opening and closing valves as through a circuit including engagement of buttons 110 and 112. These buttons not only provide a shorter circuit feed but being placed upon the movable truck body 14 and the frame 114 of the truck insures that the covers are only operated when the truck body is in the down position. It is to be noted that with the hinged end normally being swung from pivots within the frame or below the cover, the cover need not be opened for the dumping material to pass out the lower portion of the end 16 in the conventional manner. Therefore, the operating of the truck cover is required only at the times when the truck body itself is in the down or loading position.

For the loading of this truck body the sides 10 and 12 are rotated to lie against the sides of the truck with the flaps as exemplified by ends 98 swinging into alignment with the cover 90 and with pipes 76 and 66 swinging into alignment so that each flap folds upon itself to cause little protrusion of the cover beyond the side of the truck body.

It should be noted that the end members 66 and 68 need not be bent but may be made straight with the upper support members 84 and 86 made longer than as shown. The ends or flaps 98 are shaped accordingly so that the pivoted drop members 76 and 78 are substantially parallel to the plane of the top of the truck body when the cover is in the closed position.

The terms "up," "down," "in," "out," "right" and "left" and similar terms are applicable to the truck cover as described in conjunction with the accompanying drawings and such terms are merely for the purpose of description and does not necessarily apply to a position in which the truck cover may be made and used.

Protection by Letters Patent of this invention in all its aspects as the same are set forth in the appended claims is sought to the broadest extent the prior art allows.

What is claimed is:

1. In a truck cover for a dump truck body and the like in which the cover is movable with the body and is movable to uncover the truck body for the loading thereof and movable to cover the truck body during other times including during the transport of the load, wherein the improvement comprises: (a) a pair of main frames each pivotally mounted on the upper sides of the body to swing in an arc around the upper side thereof, the swing of the arc disposed to bring the inner edges together to form when the edges are together a peaked roof with an apex higher than the sides of the truck body; (b) a drop member pivotally attached to an end member of the frame and movable therewith; (c) means for rotating the main frame from a position adjacent the side of the truck body to an inner position forming one-half of a peaked roof; (d) means for engaging and camming the drop member to a position substantially parallel to the top of the body as the main frame is rotated to its inner position; (e) a cover member attached to the frame to provide a wind screen, and (f) an end flap cover member attached to and extending from the end of the frame to the drop member to provide an end flap, whereat the pair of covered main frames are rotated to their inner position, the cover forms a peaked roof and with attached end flap provides a wind screen for the load in the body and when moved to its outer position the covered main frame and end flap lie adjacent the side of the body.

2. In a track cover as in claim 1 in which the means for engaging and camming the drop member is a stop member mounted so as to engage the drop member on a portion thereof exterior of the pivot point of the drop member.

3. In a truck cover as in claim 2 in which the end member of the main frame is provided with a stop to limit the outer movement of the drop member attached thereto to a position adjacent the end member and by the end flap is limited to an inner amount of swing in the movement away from the end member and toward the truck body.

4. In a truck cover as in claim 3 in which the lower supporting side of the main frame is carried in bearings in a troughed cover; in which the supporting side of the main frame has a shaft extension coupled to a motor; in which the upper support member of the main frame is shorter than the lower supporting side of the main frame; in which the cover member is attached to the main frame at least in part by means of an elastic lacing, and in which at least one upper side member of one of the main frames is provided with a bumper adapted to engage the upper side member of the other main frame to prevent undue wear of the cover and its attaching means to the upper side member of the main frame.

5. In a truck cover as in claim 1 in which the lower supporting side of the main frame is carried in bearings in a troughed cover and with the supporting side having a shaft extension coupled to the means for rotating.

6. In a truck cover as in claim 1 in which the lower supporting side of the main frame includes a troughed member adapted to enclose for protection and retention the rotatable lower member of the main frame.

7. In a trunk cover as in claim 6 in which the troughed member is a plurality of pieces adapted for attachment to a support member such as a beam and the like, the support member adapted for mounting in retaining means on the truck body so that the lower supporting side of the main frame is substantially at the top of the truck body side.

8. In a truck cover as in claim 1 in which the upper support member of the main frame is shorter than the lower support member and in which the drop member is disposed so as to lie substantially parallel to a line extending from one lower outer end to a like lower end of the opposite main frame.

9. In a truck cover as in claim 1 in which the cover member is attached to the main frame by means providing for the displacement of the cover from and return to its normal plane on the frame without undue strain on the cover.

10. In a truck cover as in claim 9 in which the means providing for displacement and return of the cover is an elastic lacing holding the cover to the frame at least in part and in which at least one upper side member of the pair of main frames is provided with a bumper which with the cover in the closed position is adapted to engage the upper side member of the other main frame to prevent abrading of the cover and its attaching means to the upper side member of the main frame.

References Cited

UNITED STATES PATENTS

| | | | |
|---|---|---|---|
| 2,043,858 | 6/1936 | Moore | 296—100 |
| 2,979,316 | 4/1961 | Eppinger et al. | 296—100 |
| 3,051,502 | 8/1962 | Webster | 280—5.1 |
| 3,069,199 | 12/1962 | Reardon et al. | 296—24 |

BENJAMIN HERSH, *Primary Examiner.*

R. SONG, *Assistant Examiner.*